United States Patent
Wu

(10) Patent No.: US 10,276,024 B2
(45) Date of Patent: Apr. 30, 2019

(54) METHOD AND APPARATUS FOR PROMPTING REMAINING SERVICE LIFE OF COOKING DEVICE AND STORAGE MEDIUM

(71) Applicant: Beijing Xiaomi Mobile Software Co., Ltd., Haidian District, Beijing (CN)

(72) Inventor: Ke Wu, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/950,177

(22) Filed: Apr. 11, 2018

(65) Prior Publication Data

US 2018/0322762 A1 Nov. 8, 2018

(30) Foreign Application Priority Data

May 4, 2017 (CN) .......................... 2017 1 0309618

(51) Int. Cl.
*G05B 23/02* (2006.01)
*G08B 21/18* (2006.01)
*A47J 36/02* (2006.01)

(52) U.S. Cl.
CPC .......... *G08B 21/182* (2013.01); *A47J 36/025* (2013.01); *G05B 23/0283* (2013.01); *G05B 2219/2643* (2013.01)

(58) Field of Classification Search
CPC .. G08B 21/182; A47J 36/025; G05B 23/0283; G05B 2219/2643
See application file for complete search history.

(56) References Cited

U.S. PATENT DOCUMENTS 7,581,434 B1 * 9/2009 Discenzo ........... G01N 33/2888
73/53.01
2013/0260320 A1 * 10/2013 Townsend .................. F24C 7/08
431/2

FOREIGN PATENT DOCUMENTS

| CN | 103068288 A | 4/2013 |
|---|---|---|
| CN | 204740485 U | 11/2015 |
| CN | 206161800 U | 5/2017 |
| JP | 2009228968 A * | 10/2009 |
| WO | 2015191152 A1 | 12/2015 |

OTHER PUBLICATIONS

The extended European search report in EP application No. 18170856.1, dated Oct. 22, 2018.
The First Office Action in Chinese application No. 201710309618X, dated Oct. 8, 2018.

* cited by examiner

*Primary Examiner* — Nay Tun
(74) *Attorney, Agent, or Firm* — Jun He Law Offices P.C.; James J. Zhu

(57) ABSTRACT

The present disclosure relates to a method and an apparatus for prompting a remaining service life of a cooking device, and a storage medium. The method comprises: obtaining cooking operation information of a cooking process performed by the cooking device; determining a life loss of the cooking device based on the cooking operation information of the cooking process; determining a remaining service life of the cooking device according to the life loss; and prompting the remaining service life of the cooking device.

13 Claims, 6 Drawing Sheets

METHOD AND APPARATUS FOR PROMPTING REMAINING SERVICE LIFE OF COOKING DEVICE AND STORAGE MEDIUM

CROSS-REFERENCE TO RELATED APPLICATIONS

This application claims priority to and benefits of Chinese Patent Application No. 201710309618.X, filed with the State Intellectual Property Office of P. R. China on May 4, 2017, the entire contents of which are incorporated herein by reference.

TECHNICAL FIELD

The present disclosure generally relates to an electric appliance technology field, and more particularly, to a method and an apparatus for prompting remaining service life of a cooking device, and a storage medium.

BACKGROUND

A rice cooker is a necessary kitchen appliance for a family. A liner is a "heart" of the rice cooker. At present, the liners of most rice cookers are made of aluminum alloy, and the surface of the liner is mostly coated with coating (such as water-based fluorine coating). The coating has characteristics of heat resistance, corrosion resistance, non-stickiness, smoothness and the like, thus reducing a probability of ingredients sticking to the liner during cooking and avoiding direct contact between the ingredients and the liner.

However, due to long-term high temperature effect and friction and repeated washing by metal kitchenware, the coating on the surface of the liner may shed. The shed coating may be doped into the ingredients, which has a negative impact on human body. If the rice cooker with the coating shed is still used for cooking acidic food, some chemicals may be produced, which may endanger human health.

SUMMARY

In order to overcome the problems in the related art, the present disclosure provides a method and an apparatus for prompting a remaining service life of a cooking device and a storage medium.

According to a first aspect of embodiments of the present disclosure, there is provided a method for prompting a remaining service life of a cooking device. The method may be applied in a terminal and may include: obtaining cooking operation information of a cooking process performed by the cooking device; determining a life loss of the cooking device based on the cooking operation information of the cooking process; determining the remaining service life of the cooking device according to the life loss; and prompting the remaining service life of the cooking device.

According to a second aspect of embodiments of the present disclosure, there is provided an apparatus for prompting remaining service life of a cooking device. The apparatus may be applied in a terminal and may include: an obtaining module, configured to obtain cooking operation information of a cooking process performed by the cooking device; a first determining module, configured to determine a life loss of the cooking device based on the cooking operation information of the cooking process; a second determining module, configured to determine the remaining service life of the cooking device according to the life loss; and an outputting module, configured to prompt the remaining service life of the cooking device.

According to a third aspect of embodiments of the present disclosure, there is provided an apparatus for prompting a remaining service life of a cooking device, including: a processor; and a memory configured to store instructions executable by the processor. The processor is configured to: obtain cooking operation information of a cooking process performed by the cooking device; determine a life loss of the cooking device based on the cooking operation information of the cooking process; determine the remaining service life of the cooking device according to the life loss; and prompt the remaining service life of the cooking device.

According to a fourth aspect of embodiments of the present disclosure, there is provided a non-transitory computer-readable storage medium, stored therein with instructions that, when executed by a processor of a mobile terminal, cause the mobile terminal to perform a method for prompting a remaining service life of a cooking device. The method includes: obtaining cooking operation information of a cooking process performed by the cooking device; determining a life loss of the cooking device based on the cooking operation information of the cooking process; determining the remaining service life of the cooking device according to the life loss; and prompting the remaining service life of the cooking device.

Other features and advantages of the present disclosure will be described in detail in the following.

BRIEF DESCRIPTION OF THE DRAWINGS

The accompanying drawings, which are used for providing further understanding of the present disclosure, constitute a part of this specification, and serve to explain the present disclosure together with the detailed embodiments, but do not constitute a limitation to the present disclosure.

DETAILED DESCRIPTION

Reference will be made in detail to embodiments of the present disclosure. It should be understood that the detailed implementations described herein are merely used for illustrating and explaining the present disclosure. The embodiments shall not be construed to limit the present disclosure.

The present disclosure may be applied in a cooking scene. In this scene, a user may select a corresponding cooking operation (for example, operations such as cooking rice, stewing chicken soup and stewing ribs) on a cooking device (such as a rice cooker and a pressure cooker), and then the cooking device performs the cooking operation selected by the user. However, the surfaces of liners of most cooking devices are coated with coating, and due to long-term high temperature effect and friction and repeated washing by metal kitchenware, the coating on the surface of the liner may shed. In this case, the shed coating may be doped into the ingredients, which has a negative impact on human body. If the rice cooker with the coating shed is still used for cooking acidic food, some chemicals may be produced, which may endanger human health.

To solve above problems, the present disclosure provides a method and an apparatus for prompting a remaining service life of a cooking device and a storage medium. With the method, cooking operation information of a cooking process performed by the cooking device is obtained, a life loss of the cooking device based on the cooking operation information of the cooking process is determined, the remaining service life of the cooking device is determined according to the life loss, the remaining service life of the cooking device is prompted if necessary. A prompt message may be output when the remaining service life is less than or equal to a preset threshold. The prompt message is configured to prompt a user to pay attention to the remaining service life of the cooking device. In this way, it is possible to prompt the user to pay attention to the remaining service life of the cooking device in time, thus solving a problem of endangering user health due to coating shedding of a liner of the cooking device.

In the following, the present disclosure will be described in detail with reference to related embodiments.

Figure 1:
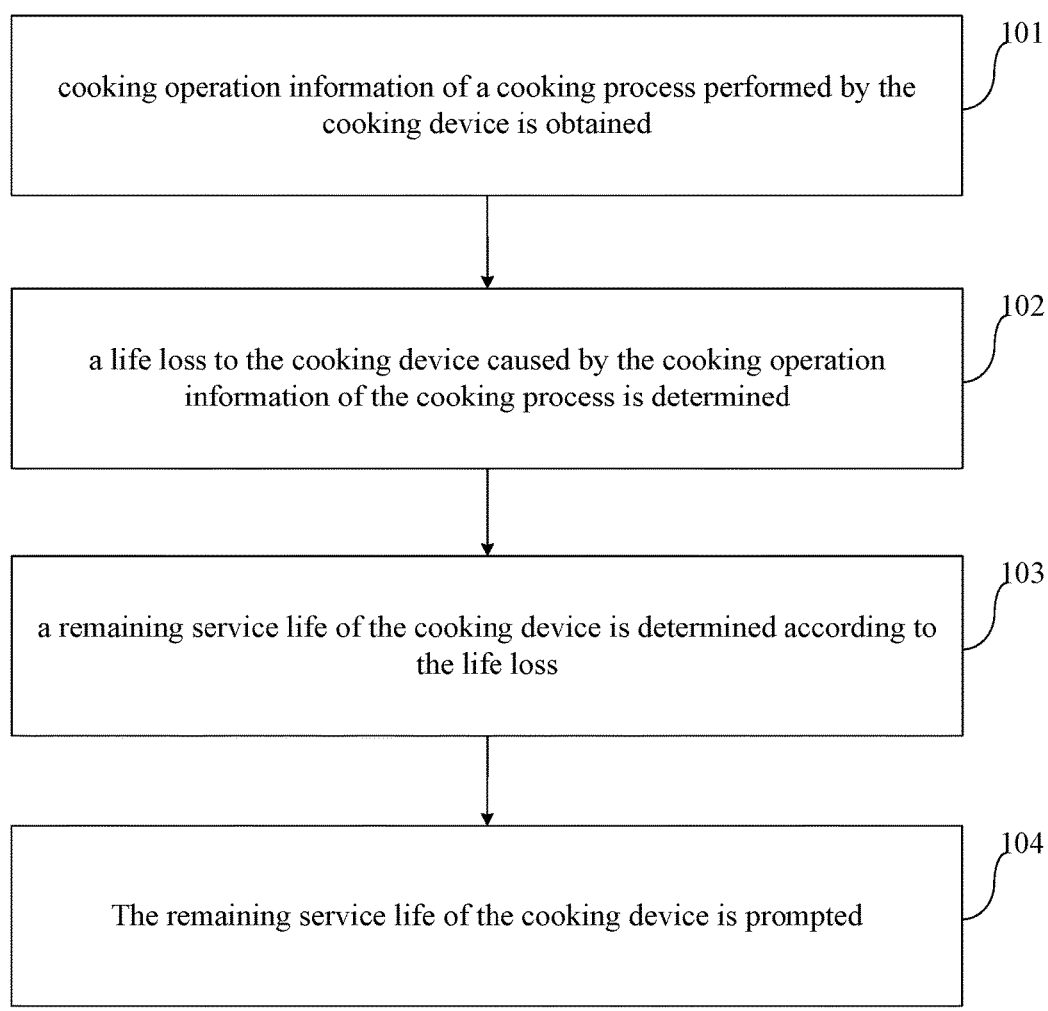
FIG. 1 is a flow chart of a method for prompting a remaining service life of a cooking device, according to an exemplary embodiment.

FIG. 1 is a flow chart of a method for prompting a remaining service life of a cooking device, according to an exemplary embodiment. As illustrated in FIG. 1, the method may be applied in a terminal, and may include the following.

At block 101, cooking operation information of a cooking process performed by the cooking device is obtained.

In some embodiments of the present disclosure, the cooking device may include a device having coating on an internal surface thereof, such as a rice cooker, a pressure cooker and a microwave oven. The cooking operation information may include operation information selected on the cooking device, such as cooking rice, cooking curry rice, stewing chicken soup, stewing ribs and the like. Above-mentioned examples are merely exemplary and explanatory, which are not limited in the present disclosure.

At block 102, a life loss of the cooking device based on the cooking operation information of the cooking process is determined.

At block 103, the remaining service life of the cooking device is determined according to the life loss.

At block 104, the remaining service life of the cooking device is prompted. Preferably, a prompt message is output when the remaining service life is less than or equal to a preset threshold.

The prompt message is configured to prompt the user to pay attention to the remaining service life of the cooking device.

With the above method, the terminal may obtain the cooking operation information of the cooking process performed by the cooking device, determine the life loss of the cooking device based on the cooking operation information of the cooking process, determine the remaining service life of the cooking device according to the life loss, and prompt the remaining service life of the cooking device. In this way, it is possible to prompt the user to pay attention to the remaining service life of the cooking device in time, thus solving a problem of endangering user health due to coating shedding of the liner of the cooking device.

Figure 2:
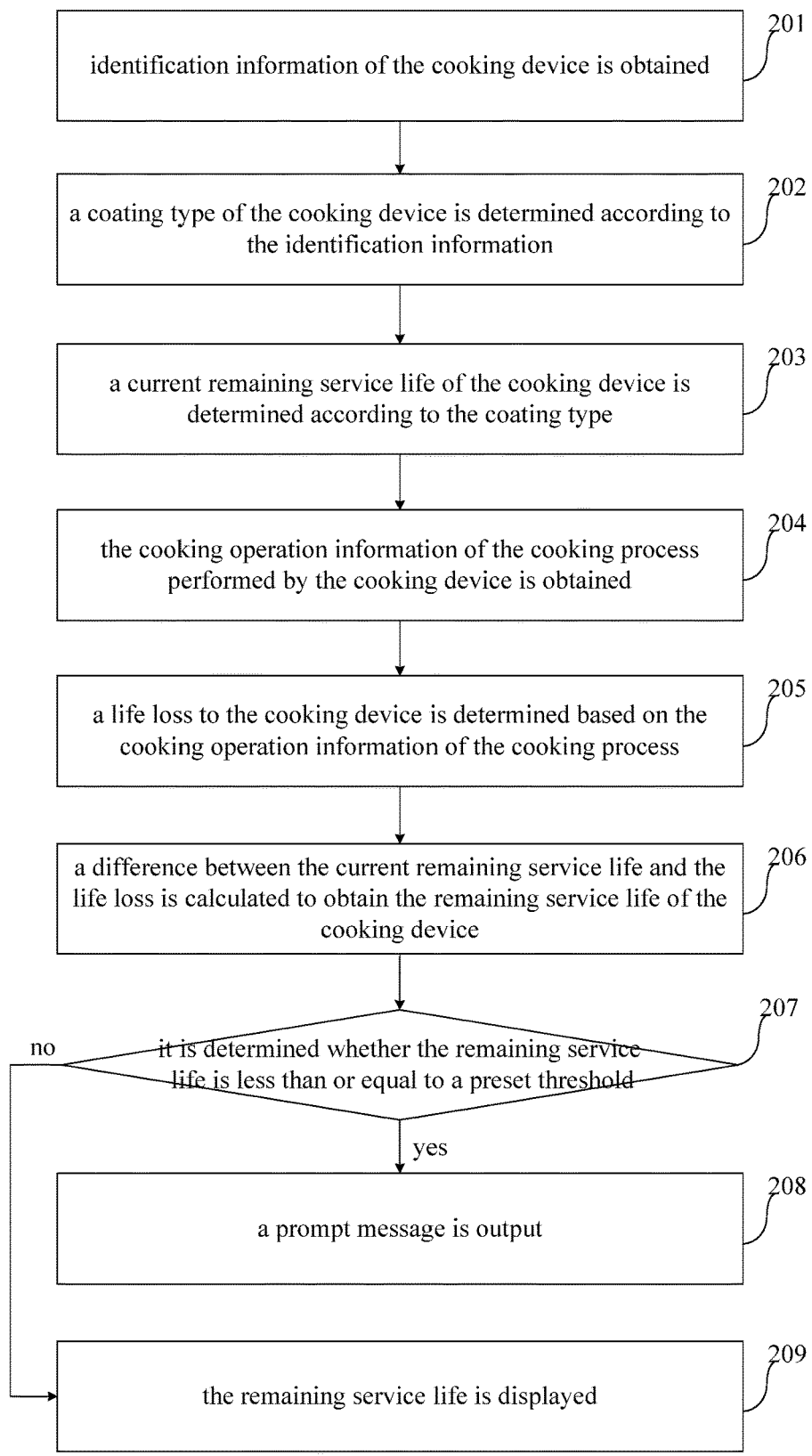
FIG. 2 is a flow chart of a method for prompting a remaining service life of a cooking device, according to another exemplary embodiment.

FIG. 2 is a flow chart of a method for prompting a remaining service life of a cooking device, according to another exemplary embodiment. As illustrated in FIG. 2, the method may be applied in a terminal and may include the following.

At block 201, identification information of the cooking device is obtained.

In some embodiments of the present disclosure, the cooking device may include a device having coating on the internal surface thereof, such as a rice cooker, a pressure cooker, a microwave oven, and the like. Above-mentioned examples are merely exemplary and explanatory, which are not limited in the present disclosure.

In some embodiments, the identification information may include a model of the cooking device. Above-mentioned examples are merely exemplary and explanatory, which are not limited in the present disclosure.

In a possible implementation, the identification information may be acquired by obtaining the model of the cooking device input by the user. For example, the model of the cooking device input by the user is Midea rice cooker MB-4088. Considering that the model of the cooking device is generally tedious, it is complex for the user to input the model of the cooking device. Therefore, in order to reduce operations of the user, the terminal may set a category list for cooking devices of different brands, for example, classifying the cooking devices according to the brands, such as Midea, Joyoung, Supor, and the like. Then, the terminal may set a category list for types of the cooking devices, for example, classifying the cooking devices according to the types of the cooking devices, such as the rice cooker, the pressure cooker, a wok, and the like. Finally, the terminal may set a category list for models of the cooking devices, for example, classifying the cooking devices according to the models of the cooking device. Thereby, the user can search for the cooking device in a display page of the terminal to obtain a category list satisfying search information. Thus, the cooking device may be found in the obtained category list. For example, a cooking device used by the user is Joyoung rice cooker JYF-40FS28, then the search information input in a search box of the display page of the terminal may be "Joyoung", and thus the terminal displays a category list of cooking devices of the brand "Joyoung". Then, the user may further search the currently displayed category list of cooking devices of the brand "Joyoung". For example, if search information "rice cooker" is input in the search box, then the terminal may obtain a rice cooker with the brand of "Joyoung". Finally, the user may further search in the search result satisfying the above search information "Joyoung" and "rice cooker". For example, first few letters, such as "JYF" of the model of the cooking device may be input to the search box, and the terminal may obtain a rice cooker with a brand being "Joyoung" and a model being "JYF" as a search result. Thus, the user may quickly find Joyoung rice cooker JYF-40FS28 in the search result, and obtain that the model of the Joyoung rice cooker is JYF-40FS28. The above examples are merely exemplary and explanatory, which are not limited in the present disclosure.

At block 202, a coating type of the cooking device is determined according to the identification information.

In some embodiments, the coating type may include universal type coating, powder coating, water-based coating, Yutong (e.g., aluminum alloys with surface treatment) wok coating, Jinggang (e.g., materials made from quartz sand) wok coating, Binchotan (e.g., charcoal-based material) coating and the like.

In this embodiment, a coating type table is obtained, in which the coating type table includes preset coating types corresponding to models of cooking devices, and then the coating type corresponding to the model of the cooking device is obtained by searching the coating type table according to the model of the cooking device. For example, the terminal may pre-establish correspondence relationship between Midea rice cooker MB-4088 and a coating type of Jinggang wok coating. Thus, after the model of the cooking device is obtained as MB-4088, the coating type of the cooking device with the model of MB-4088 may be determined as Jinggang wok coating. The above examples are merely exemplary and explanatory, which are not limited in the present disclosure.

At block 203, a current remaining service life of the cooking device is determined according to the coating type.

The current remaining service life is the remaining service life of the cooking device before performing a current cooking operation.

In this embodiment, the current remaining service life of the cooking device may be obtained through the following.

In an example, a total service life of the cooking device is determined according to the coating type.

The total service life is a service life of the cooking device when the cooking device has never been used.

Since coatings of different cooking devices have different characteristics, such as different hardness, different corrosion resistance to acidity and/or alkalinity, different stickiness resistance, and the like, different coatings have different service lives, thus making the cooking devices have different total service lives. In this embodiment, a service life relationship table may be obtained, in which the service life relationship table includes a preset correspondence relationship between the coating types and the total service lives of the cooking devices, and then the total service life of the cooking device may be obtained by searching the service life relationship table according to the coating type.

In some embodiments of the present disclosure, the powder coating and the water-based coating are taken as examples. Compared to the water-based coating, the powder coating is more resistant to acidity and/or alkalinity, and has smaller surface void, better smoothness and better non-stickiness. Therefore, the service life of the powder coating is longer than that of the water-based coating, thus making the total service life of the cooking device corresponding to the powder coating longer than that of the cooking device corresponding to the water-based coating.

It should be noted that, in order to show the service life more visually, the service life in this embodiment may be denoted as a score. The higher the score is, the longer the service life is. Certainly, the present disclosure is not limited to the score, and the service life may be represented in other forms, such as percentage and the like.

In this embodiment, the total service life may be denoted as a score. For example, the score of the total service life of the cooking device corresponding to the powder coating is 10000, and the score of the total service life of the cooking device corresponding to the water-based coating is 5000.

In an example, a history life loss of the cooking device is obtained.

The history life loss is a total life loss of the cooking device before the current cooking operation is performed. The terminal may obtain all pieces of history cooking operation information input by the user. Then, the terminal may obtain the life loss corresponding to each piece of history cooking operation information, and add all the obtained life losses to obtain the history life loss.

In this embodiment, the life loss may be denoted in a form of score. For example, two pieces of history cooking operation information of a cooking process performed by the cooking device are obtained, in which, the score of the life loss corresponding to one piece of history cooking operation information is 10, and the score of the life loss corresponding to the other piece of history cooking operation information is 20, then the score of the history life loss is 30.

In an example, the current remaining service life is obtained according to a difference between the total service life and the history life loss.

After the score of the total service life and the score of the history life loss are obtained, the difference between the score of the total service life and the score of the history life loss may be calculated to obtain the score of the current remaining service life.

For example, if the score of the total life service life of the cooking device is 10000, and the score of the history life loss is 30, the current remaining service life of the cooking device is 9970. The above examples are merely exemplary and explanatory, which are not limited in the present disclosure.

At block 204, the cooking operation information of the cooking process performed by the cooking device is obtained.

In some embodiments of the present disclosure, the cooking operation information may include operation information selected on the cooking device, such as cooking rice, cooking curry rice, stewing chicken soup, stewing ribs and the like. Above-mentioned examples are merely exemplary and explanatory, which are not limited in the present disclosure.

At block 205, a life loss of the cooking device is determined based on the cooking operation information of the cooking process.

When the cooking device performs different types of cooking operations, it may cause different degrees of acidity and/or alkalinity corrosion to the coating of the cooking device. Moreover, after the cooking device finishes the cooking operation, the cooking device may be washed with different cleaning tools, which may scrub the coating of the cooking device, thus resulting in different degrees of loss on the coating of the cooking device. In this embodiment, the terminal stores a loss relationship table thereon. The loss relationship table includes preset correspondence relationship between cooking operation information and life losses. The terminal searches the loss relationship table according to the cooking operation information of the cooking process to obtain the life loss corresponding to the cooking operation information.

In some embodiments, the loss relationship table includes the following. When the cooking operation information is cooking rice, the corresponding life loss is a score of 10. When the cooking operation information is cooking curry rice, the corresponding life loss is a score of 20. When the cooking operation information is stewing chicken soup, the corresponding life loss is a score of 25. When the cooking operation information is stewing ribs, the corresponding life loss is a score of 30. In this way, the terminal may obtain corresponding life loss just according to the cooking operation information input by the user.

At block 206, a difference between the current remaining service life and the life loss is calculated to obtain the remaining service life of the cooking device.

The remaining service life is the service life of the cooking device remained after performing the current cooking operation.

In some embodiments, if the score of the current remaining service life of the cooking device is 80, and the cooking operation information of the user is cooking rice, then the remaining service life of the cooking device is 70 since the life loss corresponding to the cooking operation information is 10. Above-mentioned examples are merely exemplary and explanatory, which are not limited in the present disclosure.

At block 207, it is determined whether the remaining service life is less than or equal to a preset threshold.

When it is determined that the remaining service life is less than or equal to the preset threshold, an action at block 208 is performed.

When it is determined that the remaining service life is greater than the preset threshold, an action at block 209 is performed.

It should be noted that, after it is determined that the remaining service life is greater than the preset threshold, the remaining service life is set as the current remaining service life of the cooking device. Thereby, when cooking operation information of the cooking process performed by the user is subsequently obtained again, a difference between the current remaining service life and a life loss corresponding to the newly obtained cooking operation information may be calculated to obtain a new remaining service life of the cooking device, and thus there is no need to re-calculate the current remaining service life, reducing load of data processing.

At block 208, a prompt message is output.

The prompt message is configured to prompt a user to pay attention to the remaining service life of the cooking device.

In some embodiments, the prompt message may be a speech prompt, such as a speech message including "the liner of the rice cooker you are using should be changed after current cooking operation is performed". The prompt message may also include a prompt tone, such as a piece of music or a piece of ring, for prompting the user to pay attention to the remaining service life of the cooking device. The prompt message may also be a breathing light or a flashing light of the terminal. For example, colors of the breathing light or flashing frequency of the flashing light may be used to prompt the user to pay attention to the remaining service life of the cooking device. Certainly, the prompt message may further include other messages that can prompt the user. For example, an animation of poison may be displayed on a screen of the terminal to prompt the user to pay attention to the remaining service life of the cooking device. Above-mentioned examples are merely exemplary and explanatory, which are not limited in the present disclosure.

At block 209, the remaining service life is displayed.

Continuing with the above example in which the score of the remaining service life of the cooking device is 70, information "the remaining service life of your Midea rice cooker MB-4088 is 70" may be displayed in a prompt box of the terminal. Above-mentioned examples are merely exemplary and explanatory, which are not limited in the present disclosure.

With the above method, the terminal may obtain the cooking operation information of a cooking process performed by the cooking device, determine the life loss of the cooking device based on the cooking operation information of the cooking process, determine the remaining service life of the cooking device according to the life loss, and output the prompt message when the remaining service life is less than or equal to the preset threshold, such that it is possible to prompt the user to pay attention to the remaining service life of the cooking device in time, thus solving a problem of endangering user health due to coating shedding of a liner of the cooking device.

Figure 3:
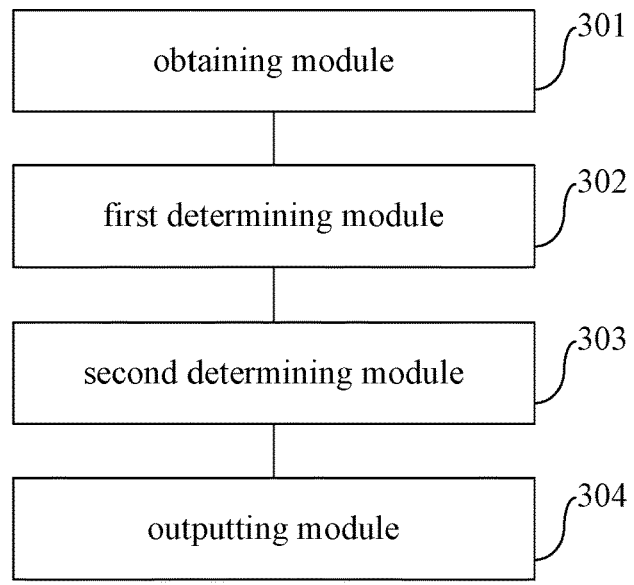
FIG. 3 is a block diagram of an apparatus for prompting a remaining service life of a cooking device, according to an exemplary embodiment.

FIG. 3 is a block diagram of an apparatus for prompting remaining service life of a cooking device, according to an exemplary embodiment. As illustrated in FIG. 3, the apparatus includes an obtaining module 301, a first determining module 302, a second determining module 303, and an outputting module 304.

The obtaining module 301 is configured to obtain cooking operation information of a cooking process performed by the cooking device.

The first determining module 302 is configured to determine a life loss of the cooking device based on the cooking operation information.

The second determining module 303 is configured to determine the remaining service life of the cooking device according to the life loss.

The outputting module 304 is configured to prompt the remaining service life of the cooking device. For example, the outputting module 304 may be configured to output a prompt message when the remaining service life is less than or equal to a preset threshold. The prompt message is configured to prompt a user to pay attention to the remaining service life of the cooking device.

Figure 4:
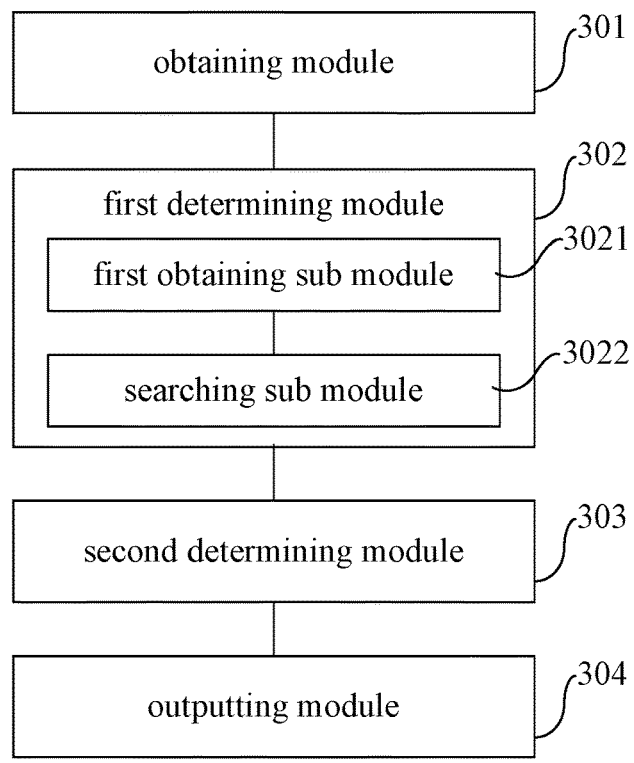
FIG. 4 is a block diagram of an apparatus for prompting a remaining service life of a cooking device, according to another exemplary embodiment.

FIG. 4 is a block diagram of an apparatus for prompting remaining service life of a cooking device, based on the embodiment illustrated in FIG. 3. The first determining module 302 includes a first obtaining sub module 3021 and a searching sub module 3022.

The first obtaining sub module 3021 is configured to obtain a loss relationship table. The loss relationship table includes preset correspondence relationship between cooking operation information and life losses.

The searching sub module 3022 is configured to search the loss relationship table according to the cooking operation information of the cooking process to obtain the life loss corresponding to the cooking operation information.

Figure 5:
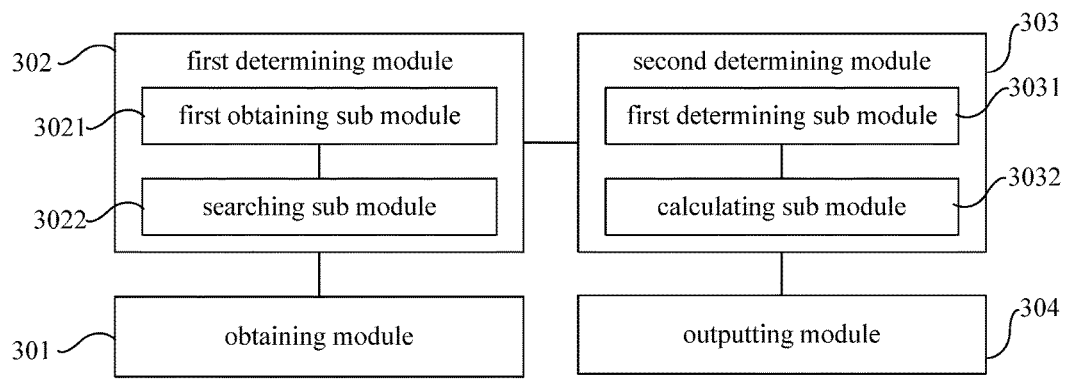
FIG. 5 is a block diagram of an apparatus for prompting a remaining service life of a cooking device, according to yet another exemplary embodiment.

FIG. 5 is a block diagram of an apparatus for prompting remaining service life of a cooking device, based on the embodiment illustrated in FIG. 3. The second determining module 303 includes a first determining sub module 3031 and a calculating sub module 3032.

The first determining sub module 3031 is configured to determine a current remaining service life of the cooking device.

The calculating sub module 3032 is configured to calculate a difference between the current remaining service life and the life loss to obtain the remaining service life of the cooking device.

Figure 6:
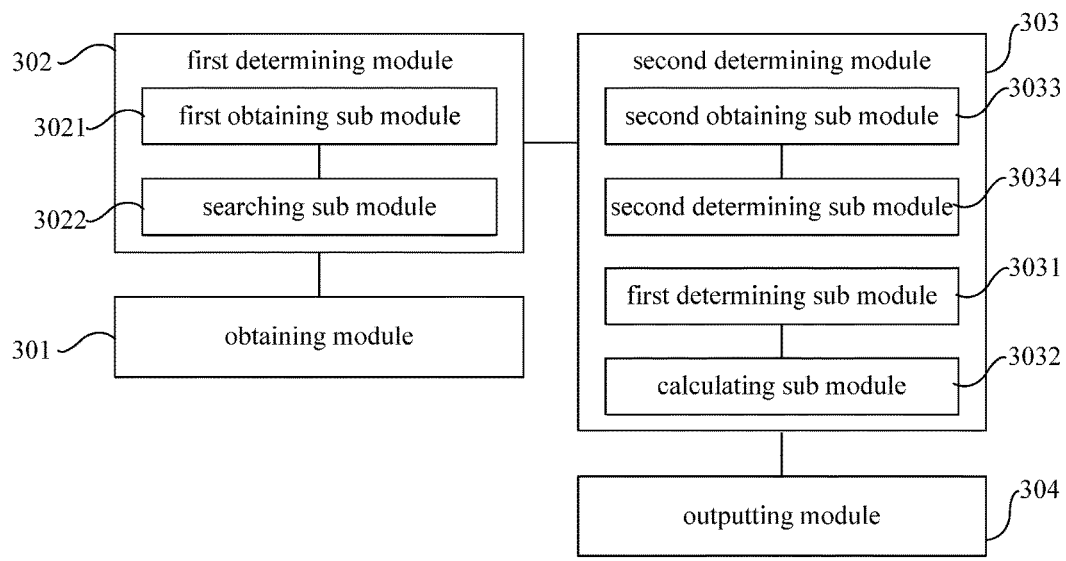
FIG. 6 is a block diagram of an apparatus for prompting a remaining service life of a cooking device, according to a yet another exemplary embodiment.

FIG. 6 is a block diagram of an apparatus for prompting remaining service life of a cooking device, based on the embodiment illustrated in FIG. 5. The second determining module 303 further includes a second obtaining sub module 3033 and a second determining sub module 3034.

The second obtaining sub module 3033 is configured to obtain identification information of the cooking device.

The second determining sub module 3034 is configured to determine a coating type of the cooking device according to the identification information.

The first determining sub module 3031 is configured to determine the current remaining service life of the cooking device according to the coating type.

In some embodiments, the identification information may include a model of the cooking device. The second determining sub module 3034 is configured to obtain a coating type table, in which the coating type table includes preset coating types corresponding to models of cooking devices, and to search the coating type table according to the model of the cooking device to obtain the coating type corresponding to the model of the cooking device.

In some embodiments, the first determining sub module 3031 is configured to determine a total service life of the cooking device according to the coating type, to obtain a history life loss of the cooking device, and to calculate a difference between the total service life and the history life loss to obtain the current remaining service life.

Figure 7:
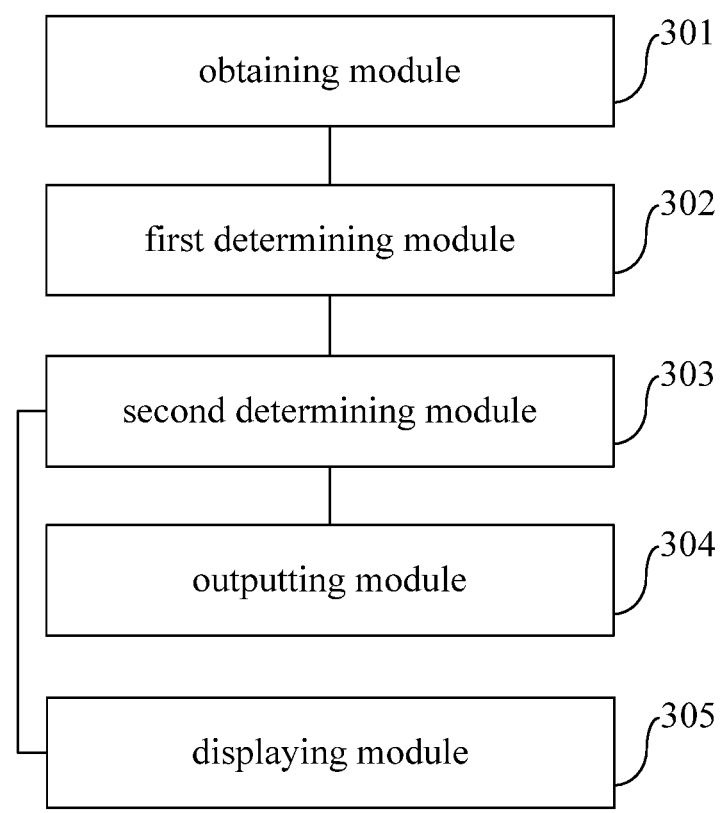
FIG. 7 is a block diagram of an apparatus for prompting a remaining service life of a cooking device, according to a yet another exemplary embodiment.

FIG. 7 is a block diagram of an apparatus for prompting remaining service life of a cooking device, based on the embodiment illustrated in FIG. 3. The apparatus may further include a displaying module 305.

The displaying module 305 is configured to display the remaining service life when the remaining service life is greater than the preset threshold.

With regard to the apparatus described in above embodiments, the specific manner for operating each module is described in relative method embodiments, which will not be described in detail herein.

With the above apparatus, the terminal may obtain the cooking operation information of the cooking process performed by the cooking device, determine the life loss of the cooking device based on the cooking operation information of the cooking process, determine the remaining service life of the cooking device according to the life loss, and output the prompt message when the remaining service life is less than or equal to the preset threshold, such that it is possible to prompt the user to pay attention to the remaining service life of the cooking device in time, thus solving a problem of endangering user health due to coating shedding of a liner of the cooking device.

Figure 8:
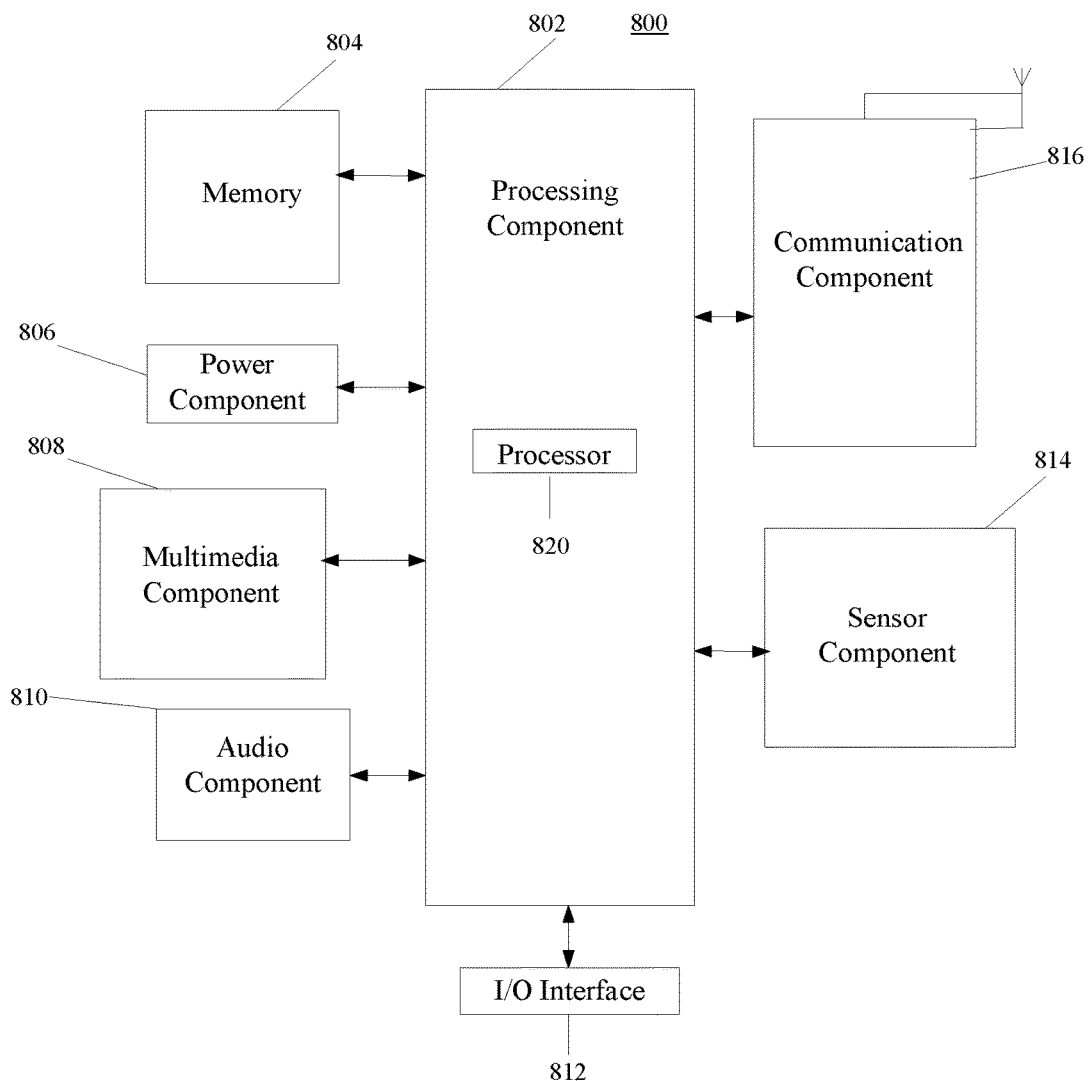
FIG. 8 is a block diagram of an apparatus for prompting a remaining service life of a cooking device, according to a yet another exemplary embodiment.

FIG. 8 is a block diagram of an apparatus 800 for prompting remaining service life of a cooking device, according to an exemplary embodiment. For example, the apparatus 800 may be a mobile phone, a computer, a digital broadcasting terminal, a message sending and receiving device, a game console, a tablet, a medical device, exercise equipment, a personal digital assistant and the like.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods for prompting a remaining service life of a cooking device. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the apparatus 800, for performing the above-described methods for prompting a remaining service life of a cooking device. For example, the non-transitory computer-readable storage medium may be a ROM, a RAM, a CD-ROM, a magnetic tape, a floppy disc, an optical data storage device, and the like.

Preferable embodiments of the present disclosure are described in detail with reference to the accompanying drawings. However, the present disclosure is not limited to the specific details of the above implementations. Various simple variations may be made to the technical solutions of the present disclosure within the scope of the technical design of the present disclosure. These simple variations should all fall within the scope of the present disclosure.

In addition, it should be noted that, the specific technical features described in the foregoing specific implementations may be combined in any suitable way without contradiction. In order to avoid unnecessary repetition, the present disclosure no longer specifies all possible combinations.

In addition, the various implementations of the present disclosure may be arbitrarily combined, as long as it does not violate the spirit of the present disclosure, which should also be regarded as the content disclosed by the present disclosure.

What is claimed is:

1. A method for prompting a remaining service life of a cooking device, comprising:
   obtaining cooking operation information from the cooking device;
   obtaining identification information of the cooking device;
   determining a coating type of the cooking device according to the identification information;
   determining a life loss of the cooking device based on the cooking operation information;
   determining the remaining service life of the cooking device according to the life loss; and
   outputting a prompt message when the remaining service life is less than or equal to a preset threshold;
   wherein determining the remaining service life of the cooking device according to the life loss comprises:
   determining a current remaining service life of the cooking device; and
   calculating a difference between the current remaining service life and the life loss to obtain the remaining service life of the cooking device;
   wherein determining a current remaining service life of the cooking device comprises:
   determining the current remaining service life of the cooking device according to the coating type.

2. The method according to claim 1, wherein determining a life loss of the cooking device based on the cooking operation information comprises:
   obtaining a loss relationship table, wherein the loss relationship table comprises preset correspondence relationship between cooking operation information and life losses; and
   searching the loss relationship table according to the cooking operation information to obtain the life loss corresponding to the cooking operation information.

3. The method according to claim 1, wherein, the identification information comprises a model of the cooking device, and determining a coating type of the cooking device according to the identification information comprises:
   obtaining a coating type table, wherein the coating type table comprises preset coating types corresponding to models of cooking devices; and
   searching the coating type table according to the model of the cooking device to obtain the coating type corresponding to the model of the cooking device.

4. The method according to claim 3, wherein determining the current remaining service life of the cooking device according to the coating type comprises:
   determining a total service life of the cooking device according to the coating type;
   obtaining a history life loss of the cooking device; and
   determining a difference between the total service life and the history life loss to obtain the current remaining service life.

5. The method according to claim 1, wherein determining the current remaining service life of the cooking device according to the coating type comprises:
   determining a total service life of the cooking device according to the coating type;
   obtaining a history life loss of the cooking device; and
   determining a difference between the total service life and the history life loss to obtain the current remaining service life.

6. The method according to claim 1, further comprising:
   displaying the remaining service life when the remaining service life is greater than the preset threshold.

7. An apparatus for prompting a remaining service life of a cooking device, comprising:
   a processor; and
   a memory, configured to store one or more program modules executable by the processor,
   wherein the one or more program modules comprise:
   an obtaining module, configured to obtain cooking operation information from the cooking device;

a second obtaining sub module, configured to obtain identification information of the cooking device;

a second determining sub module, configured to determine a coating type of the cooking device according to the identification information, a first determining module, configured to determine a life loss of the cooking device based on the cooking operation information;

a second determining module, configured to determine the remaining service life of the cooking device according to the life loss; and an outputting module, configured to output a prompt message when the remaining service life is less than or equal to a preset threshold;

wherein the second determining module comprises:

a first determining sub module, configured to determine a current remaining service life of the cooking device; and a calculating sub module, configured to calculate a difference between the current remaining service life and the life loss to obtain the remaining service life of the cooking device;

wherein the first determining sub module is configured to determine the current remaining service life of the cooking device according to the coating type of the cooking device.

8. The apparatus according to claim 7, wherein the first determining module comprises:

a first obtaining sub module, configured to obtain a loss relationship table, wherein the loss relationship table comprises preset correspondence relationship between cooking operation information and life losses; and a searching sub module, configured to search the loss relationship table according to the cooking operation information to obtain the life loss corresponding to the cooking operation information.

9. The apparatus according to claim 7, wherein, the identification information comprises a model of the cooking device, and the second determining sub module is configured to:

obtain a coating type table, wherein the coating type table comprises preset coating types corresponding to models of cooking devices; and search the coating type table according to the model of the cooking device to obtain the coating type corresponding to the model of the cooking device.

10. The apparatus according to claim 9, wherein the first determining sub module is configured to:

determine a total service life of the cooking device according to the coating type;

obtain a history life loss of the cooking device; and calculate a difference between the total service life and the history life loss to obtain the current remaining service life.

11. The apparatus according to claim 7, wherein the first determining sub module is configured to:

determine a total service life of the cooking device according to the coating type;

obtain a history life loss of the cooking device; and calculate a difference between the total service life and the history life loss to obtain the current remaining service life.

12. The apparatus according to claim 7, wherein the one or more program modules further comprise:

a displaying module, configured to display the remaining service life when the remaining service life is greater than the preset threshold.

13. A non-transitory computer-readable storage medium having stored therein one or more programs, wherein the one or more programs are configured to perform a method for prompting a remaining service life of a cooking device, the method comprising:

obtaining cooking operation information from the cooking device;

obtaining identification information of the cooking device;

determining a coating type of the cooking device according to the identification information;

determining a life loss of the cooking device based on the cooking operation information;

determining remaining service life of the cooking device according to the life loss; and outputting a prompt message when the remaining service life is less than or equal to a preset threshold;

wherein determining the remaining service life of the cooking device according to the life loss comprises:

determining a current remaining service life of the cooking device; and calculating a difference between the current remaining service life and the life loss to obtain the remaining service life of the cooking device;

wherein determining a current remaining service life of the cooking device comprises:

determining the current remaining service life of the cooking device according to the coating type.

* * * * *